(12) United States Patent
Payen et al.

(10) Patent No.: US 10,383,477 B2
(45) Date of Patent: Aug. 20, 2019

(54) AIR FLOW COOKING DEVICE

(75) Inventors: Jean-Marc Payen, Quetigny (FR); Jean-Claude Bizard, Fontaine-les-Dijon (FR)

(73) Assignee: SEB S.A., Ecully (FR)

( * ) Notice: Subject to any disclaimer, the term of this patent is extended or adjusted under 35 U.S.C. 154(b) by 750 days.

(21) Appl. No.: 11/570,300

(22) PCT Filed: Jun. 8, 2005

(86) PCT No.: PCT/FR2005/001416
§ 371 (c)(1),
(2), (4) Date: Aug. 22, 2007

(87) PCT Pub. No.: WO2006/000700
PCT Pub. Date: Jan. 5, 2006

(65) Prior Publication Data
US 2008/0163764 A1    Jul. 10, 2008

(30) Foreign Application Priority Data

Jun. 8, 2004  (FR) ..................................... 04 06214
Jun. 8, 2004  (FR) ..................................... 04 06220

(51) Int. Cl.
*A47J 37/07*  (2006.01)
*A47J 37/06*  (2006.01)
(Continued)

(52) U.S. Cl.
CPC ......... *A47J 37/0623* (2013.01); *A47J 37/043* (2013.01); *A47J 37/047* (2013.01);
(Continued)

(58) Field of Classification Search
CPC .... A47J 37/043; A47J 37/047; A47J 37/0623; A47J 37/0641; A47J 36/165;
(Continued)

(56) References Cited

U.S. PATENT DOCUMENTS 4,120,981 A    10/1978  Burkhart
4,374,319 A *  2/1983   Guibert ........................ 219/400
(Continued)

FOREIGN PATENT DOCUMENTS

DE    2 102 062    7/1972
DE    2127758     12/1972
(Continued)

OTHER PUBLICATIONS

McKeen, Fluorinated Coatings and Finishes Handbook (2006), Secs. 15.1 and 15.2.

*Primary Examiner* — Dana Ross
*Assistant Examiner* — Brandon T Harvey
(74) *Attorney, Agent, or Firm* — Cooper & Dunham LLP (57) ABSTRACT

A domestic cooking appliance (1) comprising a means for receiving (2) bulk food items (100) and a heating means comprising a means (3) for generating an air flow (4), wherein the means (3) for generating an air flow (4) comprises an air outlet (5) and an air inlet (6). The device (1) also comprises a screen (7) which is disposed relative to the air outlet (5) and the air inlet (6) such that it is possible to force the air flow (4) to effect a movement to obviate the screen (7) in order to return to the air inlet (6) from the reception means (2) onwards.

17 Claims, 5 Drawing Sheets

(51) Int. Cl.
    *A47J 37/04*      (2006.01)
    *A47J 36/16*      (2006.01)
    *A47J 37/10*      (2006.01)

(52) U.S. Cl.
    CPC .......... *A47J 37/0641* (2013.01); *A47J 36/165* (2013.01); *A47J 37/106* (2013.01)

(58) Field of Classification Search
    CPC ........ A47J 37/106; A47J 39/00; A47J 39/003; A21B 1/245; A21B 1/26; F24C 15/16; F24C 15/32; F24C 15/322; F24C 15/325
    USPC ......... 99/324, 389, 446, 447, 401, 433, 339, 99/340, 348, 474, 476, 477; 34/329; 219/385–400
    See application file for complete search history.

(56) References Cited

U.S. PATENT DOCUMENTS

| | | | |
|---|---|---|---|
| 4,503,760 A * | 3/1985 | Pryputsch et al. | 99/447 |
| 4,581,989 A * | 4/1986 | Swartley | 99/346 |
| 4,622,231 A | 11/1986 | Swartley | |
| 4,649,810 A | 3/1987 | Wong | |
| 4,706,558 A | 11/1987 | Snyder, Jr. | |
| 4,728,762 A | 3/1988 | Roth et al. | |
| 5,031,518 A * | 7/1991 | Bordes | 99/338 |
| 5,097,754 A * | 3/1992 | Covington et al. | 99/357 |
| 5,445,073 A * | 8/1995 | Gilwood | 99/427 |
| 5,466,912 A | 11/1995 | Dombush et al. | |
| 5,524,527 A | 6/1996 | Durnoux et al. | |
| 5,524,530 A | 6/1996 | Nijzingh et al. | |
| 5,590,583 A | 1/1997 | Harrison | |
| 5,801,357 A | 9/1998 | Danen | |
| 5,910,264 A | 6/1999 | Dauliach | |
| 5,927,181 A | 7/1999 | Desnoyers et al. | |
| 6,054,681 A | 4/2000 | Siu | |
| 6,077,555 A | 6/2000 | Dotan | |
| 6,172,339 B1 | 1/2001 | Thevenin | |
| 6,193,181 B1 | 2/2001 | Astegno et al. | |
| 6,225,605 B1 | 5/2001 | Beugnot et al. | |
| 6,307,193 B1 | 10/2001 | Toole | |
| 6,376,817 B1 * | 4/2002 | McFadden et al. | 219/681 |
| 6,742,444 B1 * | 6/2004 | Lai et al. | 99/330 |
| 6,772,677 B2 | 8/2004 | Marotel et al. | |
| 6,807,899 B2 | 10/2004 | Dirand | |
| 6,834,577 B2 | 12/2004 | Xu et al. | |
| 6,837,148 B1 | 1/2005 | Deschenes et al. | |
| 6,845,707 B1 | 1/2005 | Xu et al. | |
| 7,098,427 B2 | 8/2006 | Ducarrne et al. | |
| 7,145,105 B2 | 12/2006 | Gaulard | |
| 7,565,862 B2 | 7/2009 | Cartigny et al. | |
| 7,669,521 B2 | 3/2010 | Cartigny et al. | |
| 7,785,669 B2 | 8/2010 | Wang et al. | |
| 7,993,694 B2 | 8/2011 | Goderiaux et al. | |
| 8,096,440 B2 | 1/2012 | Rhetat et al. | |
| 2004/0159244 A1 * | 8/2004 | Leason | 99/348 |
| 2004/0247762 A1 | 12/2004 | Xu et al. | |
| 2005/0223906 A1 | 10/2005 | Xu et al. | |
| 2008/0213447 A1 | 9/2008 | Payen et al. | |
| 2009/0020539 A1 | 1/2009 | Rhetat et al. | |
| 2009/0301311 A1 | 12/2009 | Cartigny et al. | |
| 2010/0000418 A1 | 1/2010 | Payen et al. | |
| 2010/0000419 A1 | 1/2010 | Payen et al. | |
| 2010/0018411 A1 | 1/2010 | Bizard | |
| 2011/0126719 A1 | 6/2011 | Valance | |
| 2011/0132887 A1 | 6/2011 | Valance | |
| 2011/0147365 A1 | 6/2011 | Pellerin et al. | |
| 2011/0185917 A1 | 8/2011 | Goderiaux et al. | |
| 2012/0247343 A1 * | 10/2012 | Chang | 99/348 |

FOREIGN PATENT DOCUMENTS

| | | | |
|---|---|---|---|
| DE | 4125057 | 2/1993 | |
| DE | 4125057 C1 * | 2/1993 | A23L 1/01 |
| DE | 4124742 C2 * | 6/1994 | |
| DE | 20214744 U1 | 2/2004 | |
| DE | 202 14 744 | 3/2004 | |
| EP | 0168359 | 1/1986 | |
| EP | 0213074 | 3/1987 | |
| EP | 0591510 | 4/1994 | |
| WO | WO 83/03043 | 9/1983 | |
| WO | WO 89/10085 | 11/1989 | |
| WO | WO 97/40712 | 11/1997 | |
| WO | WO 01/24673 | 4/2001 | |
| WO | WO 2005/063097 | 7/2005 | |
| WO | WO 2006099394 A1 * | 9/2006 | |

* cited by examiner

AIR FLOW COOKING DEVICE

PRIORITY CLAIM

This patent application is a U.S. National Phase of International Application No. PCT/FR2005/001416, filed Jun. 8, 2005, which claims priority to French Patent Application No. 0406214, filed Jun. 8, 2004, and French Patent Application No. 0406220, filed Jun. 8, 2004, the disclosures of which are incorporated herein by reference in their entirety.

FIELD OF THE INVENTION

The present invention relates to appliances designed for cooking and/or heating up food, in particular loose pieces of food, and the present invention relates particularly to the field of appliances designed for cooking and/or heating up food in the presence of fat.

The present invention relates more particularly to a household appliance for cooking and/or heating food that comprises food-receiver for receiving loose pieces of food, and heater means for heating the loose pieces of food, which heater means include generator means for generating a flow of air.

BACKGROUND OF THE INVENTION

Appliances are already known in the prior art that implement a flow of air for heating or cooking food.

Such known appliances are thus provided with a fan that blows a stream of hot air over the food to be cooked, which food is disposed on a grid inside a housing.

Such prior art apparatus is specially designed so that the flow of air moves inside the housing in a cyclonic helix shape in order to facilitate heat exchange between the food and the flow of air.

Unfortunately, implementing such a cyclonic flow requires the appliance to be of relatively complex construction so as to enable air to flow around the food, while also requiring a high-power fan to be disposed in a manner that is relatively voluminous and unpleasing to the eye on the lid of the appliance.

Such prior art apparatus, which can be likened to an oven, also does not make it possible to cook or to heat up the food in a liquid cooking medium, such as, for example, a small quantity of oil.

In particular, in addition to the dynamics of the flow of air the prior art apparatus uses being relatively complex, such known apparatus does not genuinely make it possible to establish, in particularly from a thermal point of view, the conditions specific to guaranteeing that a Maillard reaction takes place that is sufficient for obtaining food having the same qualities in terms of taste as if the food were fried in a bath of oil.

It is also well known, in the prior art, that food, such as pieces of potato, can be fried in a household electric deep fryer.

In conventional manner, such a household electric deep fryer comprises a bowl designed to be filled with oil with fat, and heater resistors making it possible to heat the contents of the bowl.

Known electric deep fryers thus make it possible to provide a bath of oil or of molten fat at a high temperature and into which the food to be fried is plunged via a frying basket.

Although the conventional mode of frying by immersion into a bath of hot oil is generally satisfactory from a taste point of view, the conventional mode of frying does, however, suffer from many drawbacks.

Firstly, in order to provide the frying bath, conventional deep fryers implement a large quantity of oil. That gives rise to handling difficulties for the user when filling the deep fryer, when moving the deep fryer, and above all when emptying the deep fryer.

Such a high-temperature frying bath is also a source of a risk of being scalded, be it by oil or fat spitting from the bowl of the appliance or due to the user being clumsy (oil or fat being spilt from the appliance). That risk of scalding or of accidents is increased by the fact that such a large quantity of oil requires a relatively lengthy pre-heating stage before the food can be inserted into the bowl for frying purposes. That can lead to the user forgetting that the oil bath is being pre-heated, with all of the harmful consequences to which such absence of surveillance might give rise.

In addition, such known deep fryers are relatively costly to use since they require regular purchases of a large quantity of oil (at least 1.5 liters (l) to 2 l of oil is generally required for frying 1 kilogram (kg) of pieces of fresh potato). The user thus naturally saves oil by re-using the same frying bath a plurality of times, which is unsatisfactory from the points of view of hygiene and of taste. In addition, the user can re-use the frying bath even when the oil is degraded, which can be harmful to health. Furthermore, discarding used oil can pose serious environmental damage problems.

Finally, heating such a quantity of oil to a high temperature gives rise firstly to discharge of odors that can be particularly unpleasant, and secondly to polymerization of the oil that makes it difficult and irksome to clean the appliance.

SUMMARY OF THE INVENTION

A feature provided by the invention is to remedy the various drawbacks listed above and to propose a novel appliance for cooking and/or heating food that, while being of very simple design, makes it possible to cook and/or heat food particularly effectively and homogeneously, and in particular that makes it possible, when so desired, to obtain a result that is significantly close to frying, without implementing a large quantity of oil.

Another feature of the invention is to propose a novel appliance for cooking and/or heating food that makes it possible to achieve heat exchange that is particularly effective with the food to be heated and/or cooked.

Another feature of the invention is to propose a novel appliance for cooking and/or heating food that is of particularly simple and inexpensive construction.

Another feature of the invention is to propose a novel appliance for cooking and/or heating food that implements as few components as possible.

Another feature of the invention is to propose a novel appliance for cooking and/or heating food that makes it possible to obtain excellent heat exchange with the food by means of as few elements as possible.

Another feature of the invention is to propose a novel appliance for cooking and/or heating food that is of good compactness and overall size.

Another feature of the invention is to propose a novel appliance for cooking and/or heating food that makes it possible to cook and/or heat food particularly rapidly.

Another feature of the invention is to propose a novel appliance for cooking and/or heating food that makes it possible to provide circulation of air that is distributed extremely effectively with minimized means.

Another feature of the invention is to propose a novel appliance for cooking and/or heating food that makes it possible to heat and/or cook food particularly homogeneously.

Another feature of the invention is to propose a novel appliance for cooking and/or heating food that makes it possible to obtain food that is substantially similar to fried food, without it being necessary to plunge the food into a bath of burning-hot fat.

The features provided by the invention are achieved by means of a household appliance for cooking and/or heating food, which appliance comprises food-receiver for receiving loose pieces of food, and heater means for heating the loose pieces of food, which heater means include generator means for generating a flow of air, the household appliance further comprising the generator means for generating the flow of air and includes an air outlet from which air is blown into the food-receiver and an air inlet via which air is sucked in so as to set up the flow of air between the outlet and the inlet, the appliance further comprising a screen arranged relative to the air outlet and to the air inlet so that it forces the flow of air to go around the screen in order to reach the air inlet from the food-receiver.

BRIEF DESCRIPTION OF THE DRAWINGS

Other features and advantages of the invention appear in more detail on reading the following description with reference to the accompanying drawings, in which.

DESCRIPTION OF THE INVENTION

The invention relates to an appliance 1 for heating and/or cooking food for human consumption.

In accordance with the invention, the appliance 1 is a household appliance, i.e., the appliance is specifically designed and dimensioned for household use, e.g., for a family. To this end, the appliance 1 can be manipulated by hand by its user, e.g., so as to be moved from a cupboard to a work surface. In other words, the appliance 1 is preferably portable.

The appliance 1 of the invention is preferably designed and dimensioned for cooking and/or heating particular types of food 100 (cf. FIG. 3), such as pieces of potato. Such food 100 can have been cut manually by the user, or they can have been purchased ready-prepared from a shop, in the pre-fried and/or frozen state, for example.

Depending on the type of food, the appliance 1 is thus used genuinely to cook the food (when the food is raw), or merely to heat the food (when the food is partially or fully pre-cooked).

As described in more detail below, the general concept lying behind the invention covers a broad range of cooking modes, so that the term "cook" as used herein covers various modes of treating food, such as, for example, deep frying, frying, roasting, or browning.

In a preferred exemplary embodiment that corresponds to the examples shown in the figures, the appliance 1 of the invention is preferably designed and dimensioned to subject the food to heat treatment serving to impart taste qualities that are substantially equivalent or close to the taste qualities of fried food, and in particular food fried in a bath of oil.

In this variant, the appliance 1 of the invention thus constitutes a fryer, and more particularly a dry-fryer.

The term "dry-frying" is used herein to mean a mode of cooking food without immersing the food in a bath of oil or of fat, either partially and/or temporarily during the cooking cycle. On the contrary, "dry-frying" means cooking in which the food, although "wetted" by a cooking medium (e.g., oil), is not immersed in or swimming in that medium. In this respect, the operating principle of the fryer of the invention differs from the operating principle of a conventional deep fryer that uses a bath of oil since, in particular, the fryer of the invention makes it possible to establish conditions that are appropriate for setting up a Maillard reaction that is sufficient to impart to the food the golden and crispy property that is specific to fried food, without the food being plunged completely or directly in a bath of burning-hot oil.

For reasons of simplicity, the following description relates exclusively to an appliance 1 of the invention that forms such a dry-fryer, it being understood that other modes of cooking can be imagined with the appliance 1 of the invention, as mentioned above.

Figure 2:
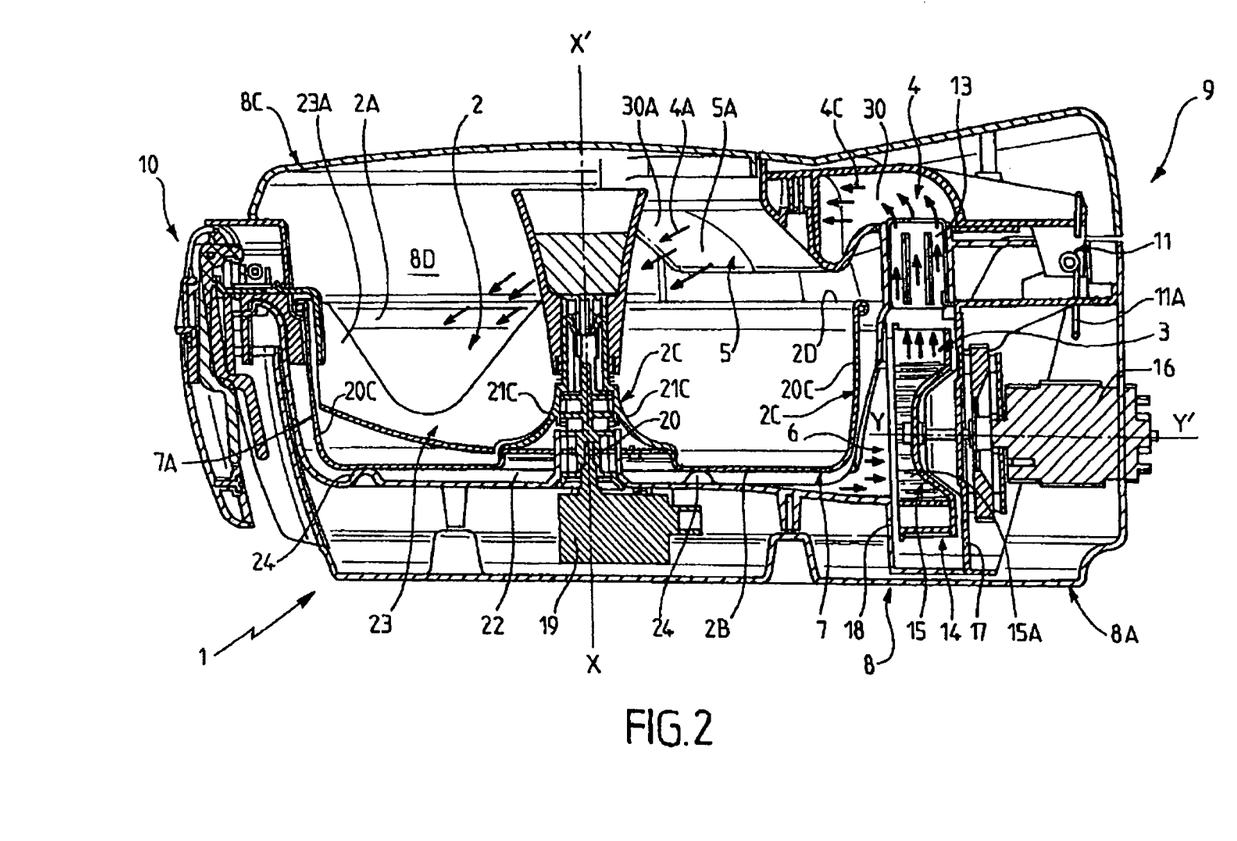
FIG. 2 is a side midplane section view of the appliance of FIG. 1.

The fryer 1 of the invention includes food-receiver 2 for receiving loose pieces of food 100 (cf. FIG. 2).

In other words, the food-receiver 2 are designed to receive food directly, i.e., higgledy-piggledy, without any wrapping, as applies generally for most food-receiver implemented in household cooking appliances.

The food-receiver 2 are thus capable, by themselves, of providing a function of supporting and holding the food 100 in a predetermined zone, in particular when the food is in particular shapes, as it is when the food 100 consists of pieces of potato that are to become fries. Naturally, the fryer 1 of the invention is not limited to producing fries, and the fryer can be used for frying other sorts of food (meat, fish, vegetables, etc.) without going beyond the ambit of the invention.

Thus, the food-receiver 2 make it very simple to use the appliance 1 since it suffices for the user to put the loose pieces of food 100 directly into the food-receiver, without it being necessary to implement any particular steps of grouping-together or over-wrapping pieces of food 100, as applies sometimes in industrial installations.

In accordance with the invention, the appliance 1 also includes heater means for heating the loose pieces of food 100, the heater means being designed to cook and/or heat the food 100.

In other words the above-mentioned heater means constitute main heater means, i.e., they are capable, on their own, of delivering at least most of the heat enabling the desired cooking and/or heating to be achieved, the heater means preferably being designed and arranged to deliver substantially all of the heat required.

In accordance with the invention, the heater means include generator means 3 for generating a flow of air 4 that are preferably generator means 3 for generating a flow of air as described in detail below.

The generator means 3 for generating the flow of air 4 are provided with an air outlet 5 from which air is blown into the food-receiver 2. In other words, air, and preferably hot air 4A, is propelled into the food-receiver 2 themselves, with a view to effecting direct heat exchange with the food 100 that is disposed in the food-receiver 2.

Preferably, the air outlet 5 is arranged relative to the food-receiver 2 in a manner such that the hot air 4A blown from the air outlet 5 is blasted directly onto the loose pieces of food 100 disposed in the food-receiver 2.

Thus, the air outlet 5, preferably formed by an ejection nozzle 5A, constitutes the starting point for a segment of the flow of air 4A directed so as to strike substantially directly at least a portion of the food 100 disposed in the food-receiver 2, which thus form a cooking chamber for the food 100.

In the meaning of the invention, the hot air 4A blown from the outlet 5 is propelled positively, unlike, for example, merely by natural convection.

The direct impact of the hot air 4A blown from the outlet 5 directly onto the food 100 contributes to excellent heat exchange with the pieces of food 100 for the purpose of cooking them.

When the food 100 in question is coated with fat (e.g., with oil), the direct impact of the jet of hot air 4A coming from the outlet 5 contributes to achieving cooking that is substantially equivalent, from the point of view of the result, to the cooking that would have been obtained if the food had be plunged into a bath of oil, but naturally without the drawbacks related to that method of cooking.

In accordance with the invention, the generator means 3 for generating the flow of air 4 are also provided with an air inlet 6 via which air is sucked in so as to establish the flow of air 4 between the outlet 5 and the inlet 6.

In other words, the flow of air 4 generated by the generator means 3 is established in the direction going from the outlet 5 to the inlet 6, which inlet 6 sucks air into the appliance 1, and in particular contributes to extracting the air present in the food-receiver 2 from the food-receiver 2.

In accordance with the invention, circulation of air is set up between the outlet 5 and the inlet 6, this circulation of air being forced because both ejection of the air from the output 5 and also suction of the air into the inlet 6 are performed positively, by suitable means that are described in detail below. In other words, the appliance 1 of the invention is advantageously provided with positive air ejection means which are preferably hot air ejection means, and with positive air suction means. In particular, this means that the air inlet 6, which is preferably formed by a louvered intake 6A, is not merely a vent but the air inlet is indeed an air intake orifice.

The air inlet 6 is advantageously distinct from the air outlet 5, and the air inlet is situated remotely therefrom.

In accordance with an important characteristic of the invention, the appliance 1 includes a screen 7 arranged relative to the air outlet 5 and to the air inlet 6 so as to force the flow of air 4 to go around the screen 7 in order to reach the air inlet 6 from the food-receiver 2.

Thus, in accordance with this technical characteristic, the screen 7 is positioned in the flow of air 4 in a manner such that the flow of air is constrained to go all the way around the screen 7 in order to reach the inlet 6 from the inside of the food-receiver 2, inside which the food 100 is situated, under the combined effects of the propulsion force exerted from the ejection nozzle 5A and of the suction force exerted in the vicinity of the louvered intake 6A.

The screen 7 thus forms a deflector member for deflecting the flow 4, which member is arranged so as to form an obstacle preventing the air present in the food-receiver 2 from returning directly, in a straight line, towards the louvered intake 6A.

The general principle lying behind the invention thus consists in complicating the passageway for the flow of air 4 from the food 100 towards the louvered intake 6A by making the path of the flow of air 4 sufficiently sinuous so that, in particular, it lengthens to as large an extent as possible the time for which the hot air 4A that is blown from the nozzle 5A dwells inside the food-receiver 2, thereby working in favor of excellent heat exchange between the food 100 and the flow of air 4.

Specifically implementing a flow-around path around the screen 7 also makes it possible to work in favor of setting up turbulent movements of air that contribute to the desired technical effect of optimizing the cooking.

Preferably, the screen 7 is formed by a deflector wall 7A for deflecting the flow 4, which wall is interposed across the path of the flow of air 4 between the outlet 5 and the inlet 6.

The air of the flow 4 is thus caused to flow at least in part along a first face of the wall 7A forming the screen 7, and then to effect a U-turn at the end edge of the wall so as then to flow back in the opposite direction along at least a portion of the opposite face of the wall.

Naturally, the screen 7 can be formed by any technical means other than a wall, panel, flap, or deflector fin insofar as the alternative means used do indeed make it possible to achieve the desired flow-around function, for the purpose of working in favor of greater heat exchange between the flow of air 4 and the food 100 and the food-receiver 2.

Advantageously, the deflector wall 7A is substantially non-perforated, i.e., in other words, the structure of the deflector wall is substantially uninterrupted, so as to prevent a large proportion of the flow of air 4 from passing through the deflector wall directly to the inlet 6. Thus, the screen 7 is substantially impermeable to the flow of air 4, so that the flow of air is incapable of passing directly through the screen 7, and rather the flow of air is forced to go around the screen.

Figure 3:
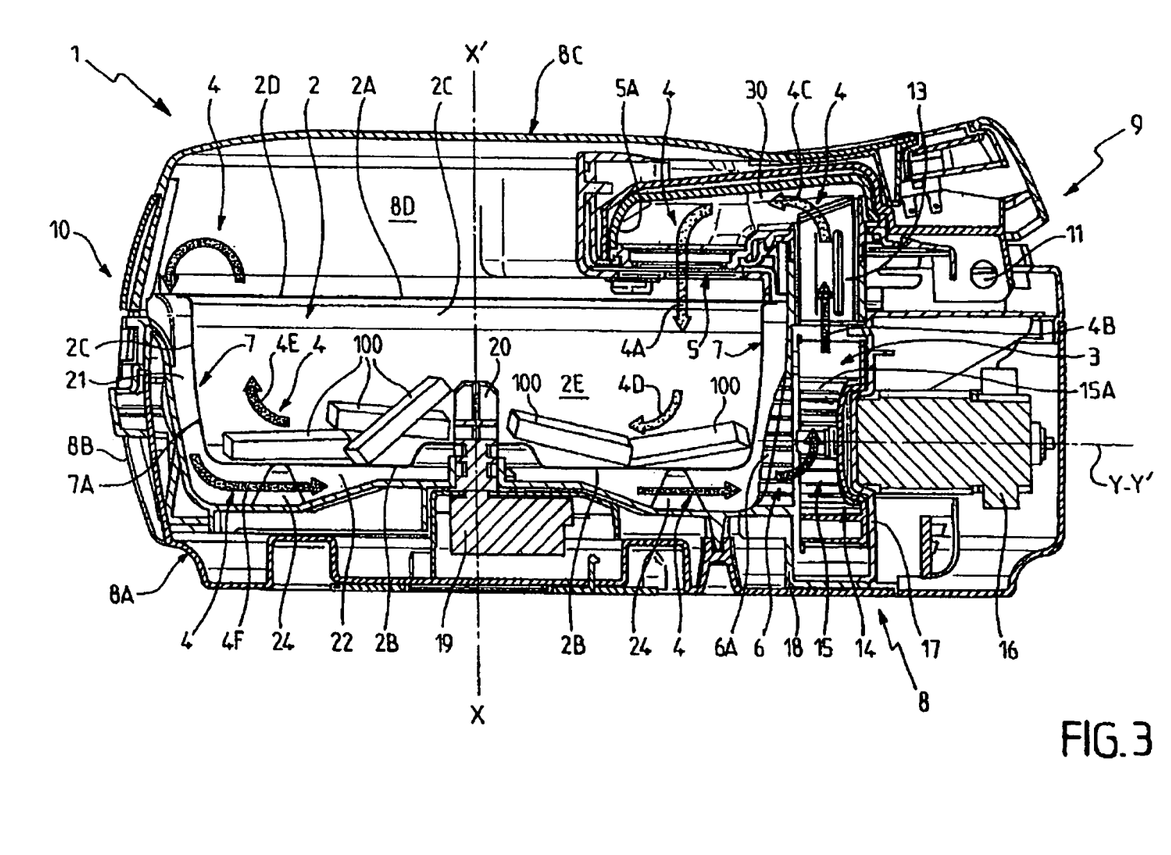
FIG. 3 is a side section view of a second exemplary embodiment of a cooking appliance of the invention.

Particularly advantageously, the food-receiver 2 for receiving the food 100 comprise a receptacle 2A (shown in FIGS. 2 and 3), the receptacle 2A preferably having firstly a bottom 2B on which it is intended for the food 100 to rest, as shown in FIG. 3, and secondly a side wall 2C extending from the bottom 2B to a top edge 2D.

In the exemplary embodiment shown in FIG. 3, the bottom 2B is substantially disk-shaped, while the side wall 2C has an annular shape and extends vertically from the bottom 2B around the periphery thereof, so that, with the bottom 2B, the side wall forms a receptacle having a top opening through which food can be inserted and which is defined by the top edge 2D.

In the exemplary embodiment shown in FIG. 2, the receptacle 2A has a bottom 2B that is in the shape of substantially plane annular ring, from the inside periphery and from the outside periphery of which an outer side wall 20C and an inner side wall 21C respectively extend facing each other, so that the receptacle 2A is substantially in the general shape of an annular channel, the channel being circularly symmetrically about a vertical axis X-X'. In other words, in the variant shown in FIG. 2, the receptacle 2A is in the general shape of a torus, generated by a substantially U-shaped open profile being rotated about the axis of symmetry X-X'.

Preferably, the receptacle 2A defines a food-receiver volume 2E that is open, i.e., that is defined merely by the bottom 2B and by the side wall 2C, without any lid element being disposed on the rim 2D opposite from the bottom 2B, the food-receiver volume 2E advantageously being designed to receive both the food and the fat, even when the fat is in liquid form (e.g., when the fat is an oil).

Advantageously, the screen 7 comprises the receptacle 2A. In other words, the receptacle 2A itself contributes directly to forming all or part of the screen 7, i.e., the receptacle performs a dual function of receiving the food 100 and of forming the screen 7 around which the flow of air 4 must go. The screen 7 thus belongs to the receptacle 2A, the screen 7 and the receptacle 2A coinciding with each other, i.e., forming one and the same part.

In this preferred exemplary embodiment, it is thus the bottom 2B and the side wall 2C that, at least in part, form the screen 7 around which the flow of air 4 must go, the flow of air 4 being forced, when the flow of air is situated at the bottom of the receptacle 2A, to rise along the side wall 2C before going back down the other side of the side wall 2C, and then reaching the louvered intake 6A which is preferably positioned at a height that is substantially equal to or lower than the height at which the bottom 2B is situated.

In order to enable the receptacle 2A to perform its function as a screen 7 to the full, the side wall 2C of the receptacle is preferably substantially non-perforated, at least in its bottom portion (i.e., in the vicinity of where the screen is connected to the bottom 2B) and preferably over its entire height, so as to prevent the flow of air 4 from passing through the screen directly.

Similarly, the bottom 2B of the receptacle is substantially non-perforated, and preferably fully uninterrupted, also so as to prevent the flow of air 4 from passing through the bottom directly in order to reach the louvered intake 6A.

However, it can be noted that, when the quantity and the type of food 100 and the way in which the food is disposed suffice to form a barrier that is substantially impassable for the flow of air 4A, it is possible to imagine implementing a bottom 2B optionally having perforations, in which case such perforations are closed off by the food 100 itself.

However, preferably, the receptacle 2A is designed to contain both the food 100, which is generally in solid form, and also the fat in liquid form or in semi-liquid form. The receptacle 2A thus advantageously has an uninterrupted structure, i.e., a non-perforated structure, at least in the interface zone in which the receptacle interfaces with the food 100 and with the fat, in order to avoid any leakage of the fat from the receptacle 2A through the bottom 2B.

Figure 1:
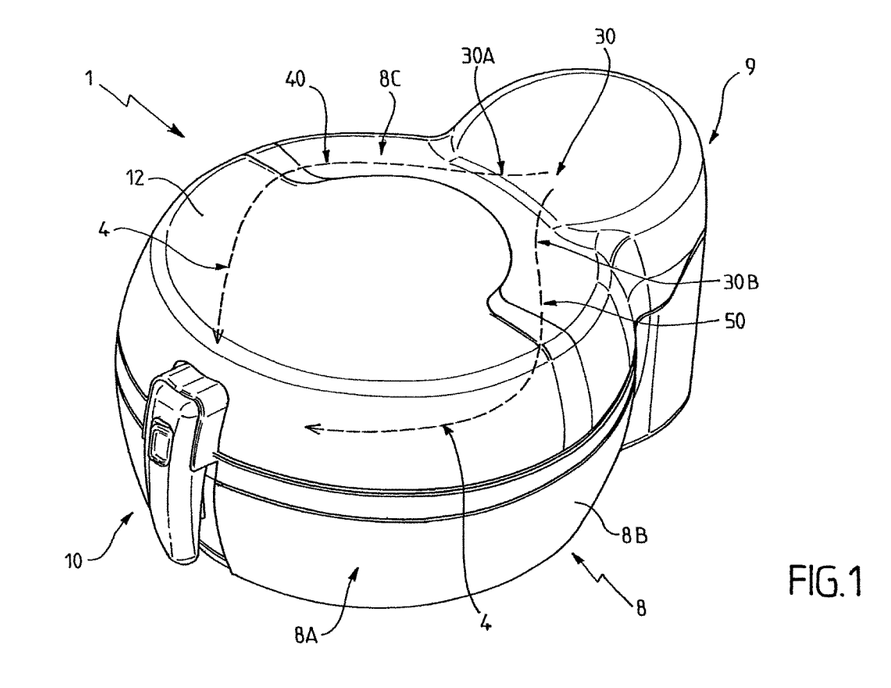
FIG. 1 is an overall perspective view of a first exemplary embodiment of a cooking appliance of the invention.

Thus, in this particularly advantageous variant that is shown in FIGS. 1-3, the desired technical effect is obtained with a minimized number of components since the desired technical effect is based merely and essentially on appropriate relative positioning and shaping of the outlet 5, of the inlet 6, and of the receptacle 2A.

Preferably, as is shown in FIG. 2, the air inlet 6 is preferably positioned at a height significantly lower than the height of the top edge 2D, when the appliance 1 is in its normal operating position.

Advantageously, the air inlet 6 is positioned substantially under and in the vicinity of the plane in which the bottom 2B of the receptacle 2A extends, so that, in order to reach the suction inlet 6, the flow of air 4 brushes along the bottom 2B as the air flows along its path, thereby contributing to keeping the bottom 2B at a high temperature that works in favor of cooking of the food 100.

Advantageously, the air outlet 5 is positioned above the food-receiver 2A, so as to open out substantially towards the food 100, or at least towards the food-receiver volume 2E defined by the receptacle 2A.

Preferably, the ejection nozzle 5A that forms the outlet 5 is disposed facing the top opening of the receptacle 2A that is defined by the top edge 2D, so that the nozzle makes it possible to expel air 4A towards the inside of the receptacle, the flow of air 4A generated in this way preferably being directed substantially vertically downwards (as in the variant shown in FIG. 3), or substantially slantingly downwards (as in the variant shown in FIG. 2).

Preferably, the air inlet 6, which is advantageously formed by a louvered intake 6A, opens out laterally relative to the food-receiver 2A, i.e., the air inlet opens out along an axis Y-Y' that is substantially perpendicular to the axis of the air outlet 5 (as in the variant shown in FIG. 3), or at least along an axis Y-Y' that intersects the axis of the air outlet 5 (as in the variant shown in FIG. 2).

Advantageously and in a manner known per se, the appliance 1 of the invention further comprises a housing 8 serving to receive the food 100 to be cooked (i.e., to be fried, in the examples shown in the figures).

As shown in the figures, the housing 8 includes a base 8A serving to form the footing of the appliance 1, and advantageously shaped to stand stably on a surface or on a support (e.g., on the top of a kitchen table).

A side skirt 8B extends upwards from the base 8A and around the periphery thereof, the skirt being, for example, made of a metal material or of a plastics material, and forming the outer casing of the appliance 1. The side skirt 8B can have any geometrical shape that is suitable in terms both of being functional and of being pleasing to the eye. For example, for the fryers shown in the figures, the skirt, as seen from above, presents a substantially "figure-of-eight" shape, the top of the figure-of-eight defining the back 9 of the fryer 1, while the bottom of the figure-of-eight defines the front 10 of the fryer 1.

Advantageously, the housing 8 also includes a lid 8C that is positioned relative to the base 8A in a manner such that the side skirt 8B extends between the base 8A and the lid 8C so as to define a compartment 8D inside which the food-receiver 2 are mounted, as can be seen more particularly in FIGS. 2 and 3.

In a preferred exemplary embodiment, as shown in FIGS. 2-5, the housing 8, and more particularly the base 8A, is provided with bosses 24 on which it is intended for the receptacle 2A to stand. The bosses 24 thus preferably form a separation member between the bottom 2B of the receptacle 2A and the base 8A, which separator member makes it possible to define an interstitial space 22 enabling air to circulate under the bottom 2B.

The compartment 8D and the receptacle 2A are preferably shaped relative to each other so that an interstitial space 21 remains between the side wall 2C and the skirt 8B, the interstitial space 21 making it possible for air to circulate outside the receptacle 2A, along the side wall 2C.

Advantageously, the lid 8C is mounted to move between firstly a closed position (shown in the figures), in which the lid 8C co-operates with the base 8A and with the side skirt 8B to form a substantially closed enclosure around the food to be fried, which food is resting in the receptacle 8A, and secondly an open position (not shown), allowing the food that is to be fried to be inserted into the receptacle 8A inside the housing.

In other words, the lid 8C co-operates with the skirt 8B and with the base 8A to form a housing that is substantially closed, i.e., that is preferably substantially airtight, allowing cooking to take place in a closed atmosphere (ignoring any residual leaks). The substantially airtight closure of the appliance can, for example, be achieved at the lid 8C by means of sealing gaskets (not shown).

As is shown in the figures, the lid 8C is advantageously mounted to pivot relative to the remainder of the housing 8, e.g., by means of a resilient pivot coupling formed by a hinge 11 provided with a torsion spring 11A, so that the opening position of the lid 8C is also a return position. The hinge 11 is also preferably positioned at the periphery of the appliance 1, e.g., in the vicinity of the back 10 of the appliance 1, as is shown in particular in FIGS. 2 and 3.

Advantageously, and as shown in FIG. 1, the lid 8C can be provided with a transparent viewing zone 12 made, for example, of glass, so as to enable the progress of the frying inside the appliance 1 to be checked during the cooking cycle, when the lid 8C is in the closed position.

Advantageously, the food-receiver 2 are formed as a block, i.e., they form a single unit which is preferably in the form of a single piece. Preferably, in order to perform their function as a container of food and of fat, the food-receiver 2 are also non-perforated, unlike a basket, for example, in order to avoid any leakage of fat.

Advantageously, as shown in particular in FIG. 2, the air outlet 5 and the air inlet 6 open out into the compartment 8D respectively at the lid 8C and at the skirt 8B. In other words, the outlet 5 is preferably provided in the lid 8C (cf. FIGS. 2 and 3), while the inlet 6 is provided in the side skirt 8B (cf. FIGS. 2 and 3).

In a preferred exemplary embodiment which corresponds to the exemplary embodiments shown in the figures, the generator means 3 for generating the flow of air 4 are designed to provide air circulation in a closed circuit inside the appliance 1. The flow of air 4 is thus preferably a recycled flow that is substantially non-regenerated. In other words, the fryer 1 works in a substantially closed atmosphere, air present inside the compartment 8D being taken at the louvered intake 6A so as to be heated, and then propelled over the food from the ejection nozzle 5A. The propelled hot air cools on coming into contact with the food 100, and is then taken again so as to be re-heated, and so on.

Advantageously, the heater means comprise a heat-generator element 13 for heating the air that is to be blown from the air outlet 5, so that the air 4A ejected from the ejection nozzle 5A towards the food 100 is hot air. Thus, the generator means for generating a flow of air that are implemented in the context of the invention are preferably means for generating a flow of hot air, i.e., a flow of air at a temperature sufficient to perform the desired cooking and/or heating function, depending on the food in question.

However, it can be imagined, without going beyond the ambit of the invention, that the flow of air 4A is not a flow of hot air, but rather merely means for moving the atmosphere prevailing inside the compartment 8D, which atmosphere can be heated elsewhere by distinct means.

Advantageously, the generator means 3 for generating the flow of air 4 comprise air drive means 14 disposed in air-flow communication between the inlet 6 and the air outlet 5, the drive means 14 being designed both, and preferably simultaneously, to suck in air via the inlet 6 and also to deliver the sucked-in air via the outlet 5.

Preferably, the air drive means 14 comprise a centrifugal fan 15 arranged to generate a flow of air by sucking in air from the compartment 8D via the louvered intake 6A and by delivering the air to a ducting device 30 terminated by the ejection nozzle 5A, which nozzle opens out towards and above the food 100 present in the housing 8.

The heat-generator element 13 is preferably positioned in the flow of air generated by the fan 15, preferably downstream from the fan 15 and upstream from the outlet nozzle 5A in the direction of the flow 4, so as to transform the flow of air into a flow of heating air.

Advantageously, the heat-generator element 13 comprises an electrical resistance system with resistive strips and/or resistive wires held on an insulating support, which is a solution that saves space and that offers good efficiency. Preferably, the resistive strips and/or the resistive wires are placed in the flow of air as a function of the distribution of the speed air in the flow, so as to avoid any hot spots. In addition, the power of the electrical resistance system is determined so as to heat the food quickly without drying the food out. Preferably, the power lies substantially in the range 1000 watts (W) to 2000 W, and more preferably in the range 1200 W to 1400 W.

It should also be noted that a filter can be provided upstream from the centrifugal fan 15, e.g., at the louvered intake 6A.

In the variant of FIG. 3, the ducting device 30 comprises a single duct that opens out into the ejection nozzle 5A which is also a single nozzle, so that the flow of air 4A is propelled in a single fluid stream.

Naturally, the invention is not limited to a particular number of fluid streams, and, in particular, it is quite possible for the flow of heating air 4A to have two or more streams instead of a single stream.

Thus, the variant of FIGS. 1 and 2 implements two distinct streams of hot air 40, 50 that converge substantially symmetrically, in mutually opposite manner (cf. FIG. 1). In this variant (shown in FIGS. 1 and 2), the ducting device 30 is subdivided into two ducts 30A, 30B in a substantially Y-shaped configuration, downstream from the heat-generator means 13 in the direction of the flow 4. Each of the two ducts 30A, 30B is terminated by a corresponding nozzle 5A extending slantingly relative to the axis X-X' towards the front 10 of the fryer 1 and towards the bottom thereof.

Preferably, the centrifugal fan 15 comprises an impeller 15A driven in rotation about an axis Y-Y' corresponding to the axis of the louvered intake 6A, the axis Y-Y' being substantially perpendicular to the axis X-X' of symmetry of the receptacle 2A. The impeller 15A is preferably driven in rotation by an electric motor 16 and is advantageously inserted in a volute casing formed by a back plate 17 mounted on a front plate 18.

Advantageously, the entire air circuit implemented by the generator means 3 for generating the flow of air 4 is dimensioned so that the flow of hot air 4A blown from the ejection nozzle 5A reaches the food contained in the receptacle 2A at a speed that is significantly greater than 2 meters per second (m/s), and that is preferably substantially equal to or greater than 3 m/s. The choice of such a minimum speed makes it possible to achieve optimum cooking, by working in favor of firstly the formation, at the surface of the food, of a crispy jacket without the surface drying out, and secondly slow cooking through to the core of the food, to keep a soft consistency.

Advantageously, the air circuit is designed so that the temperature of the flow of hot air is significantly less than 200° C. at the food, and is preferably less than 180° at the food 100. A temperature that is significantly greater than the above-mentioned limits can be a source of unpleasant odors, and does not necessarily make it possible to achieve a significant saving in cooking time.

Preferably, the centrifugal fan 15 is positioned at the back 10 of the appliance 1, and is mounted on the base 8A and/or on the skirt 8B (and not directly on the lid 8C), which makes it possible to minimize the overall vertical size of the appliance 1, while also enabling the lid 8C to be manipulated easily.

It should also be noted that the overall lateral size of the appliance 1 is also optimized by implementing a fan of the centrifugal blower type that makes it possible to generate the flow of air in a minimized amount of space, which depends essentially on the size of the electric motor driving the impeller.

Advantageously, in the housing 8, the fryer 1 includes means for automatically coating the food to be fried with a film of fat, by mingling the food with fat.

In other words, unlike in prior art apparatus, in which the food is immersed in a bath of oil, in this exemplary embodiment of the appliance of the invention the frying is performed merely by covering the surface of the food with a thin coat of oil or of any other suitable edible fat. Thus, the cooking does not take place in a bath of oil, which requires the presence of a large quantity of fat surrounding the food fully or partially, but rather by means of a small quantity of oil forming a thin coating that is substantially uniform on the surface of each of the pieces of food placed in the main body 2.

As specified above, the coating with fat is performed automatically, i.e., without requiring an essential and direct contribution from the user in order to establish the film of fat at the surface of the food. In other words, by means of the presence inside the housing 8 of means for automatically coating the food with a film of fat, the user merely has to insert the food into the housing 8 of the fryer 1, and then merely has to switch on the automatic coating means (if such switching-on is not itself automatic) so that the fryer 1 itself directly and inside the housing 8 individually coats each piece of food with a fine coat of fat, without the user being obliged to perform this coating operation manually.

The term "mingling" is used herein to mean the action of mingling, i.e., of "stirring while mixing". In the meaning of the invention, the food is thus coated by combining the food and the fat and mingling them so as to cover the food with a film of fat.

Advantageously, the means for automatically coating the food with a film of fat comprise firstly the food-receiver 2, which are designed to contain, preferably directly, both the food to be fried and the fat, in particular when the fat is in liquid form (oil or molten fat), and secondly stirrer means 23 (shown in FIGS. 2 and 5 only) for stirring the food contained in the food-receiver 2.

Advantageously, the food-receiver 2 and the stirrer means 23 are distinct.

In accordance with the invention, the food-receiver 2 and the stirrer means 23 are designed to be moved relative to each other so as to mingle and stir the food and the fat inside the food-receiver 2, so as substantially to cover each piece of food 100 with a substantially uniform, homogeneous, and continuous film of fat.

Figure 4:
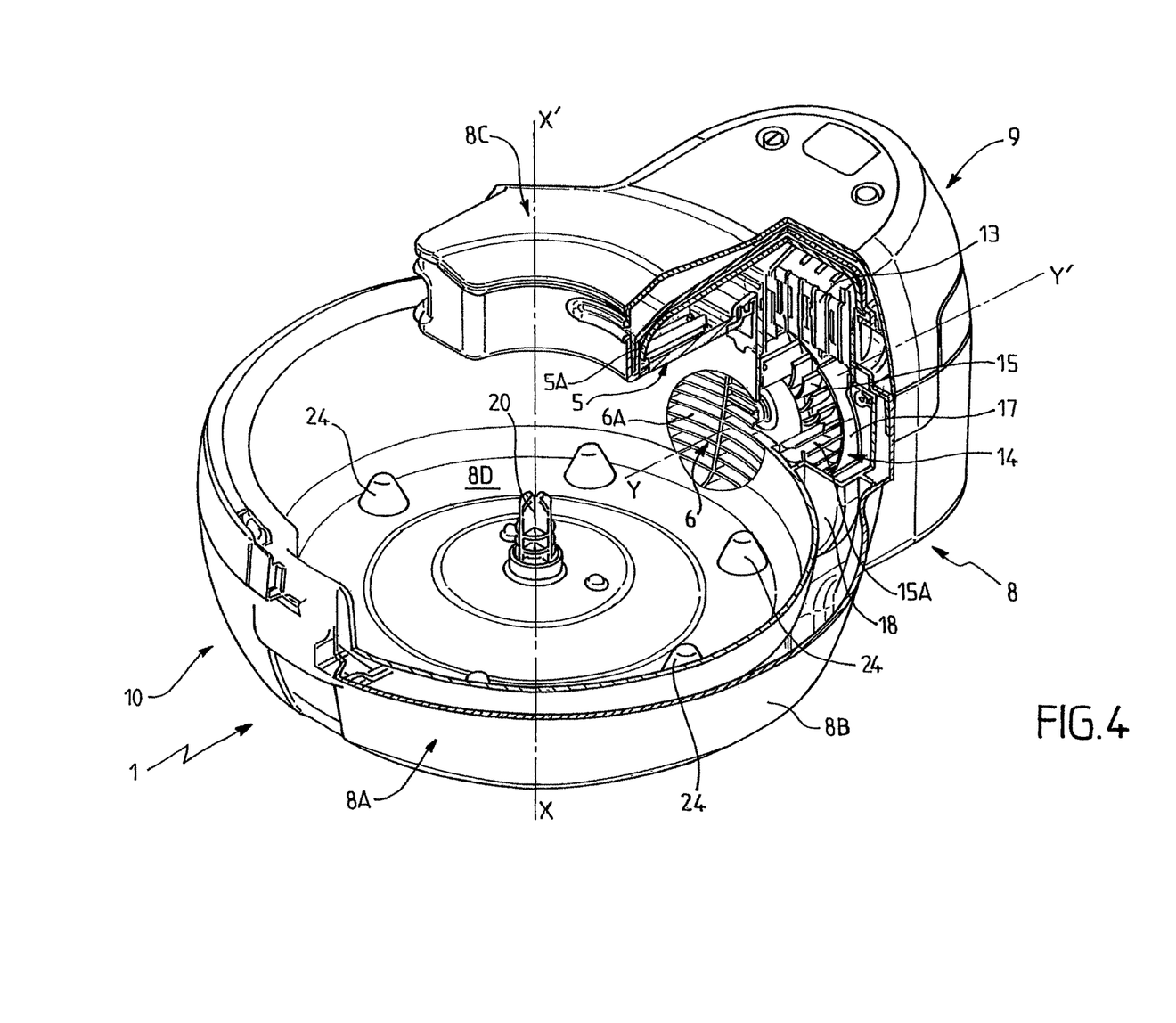
FIG. 4 is a cutaway perspective view of a detail of the exemplary embodiment of the cooking appliance of FIG. 3.
Figure 5:
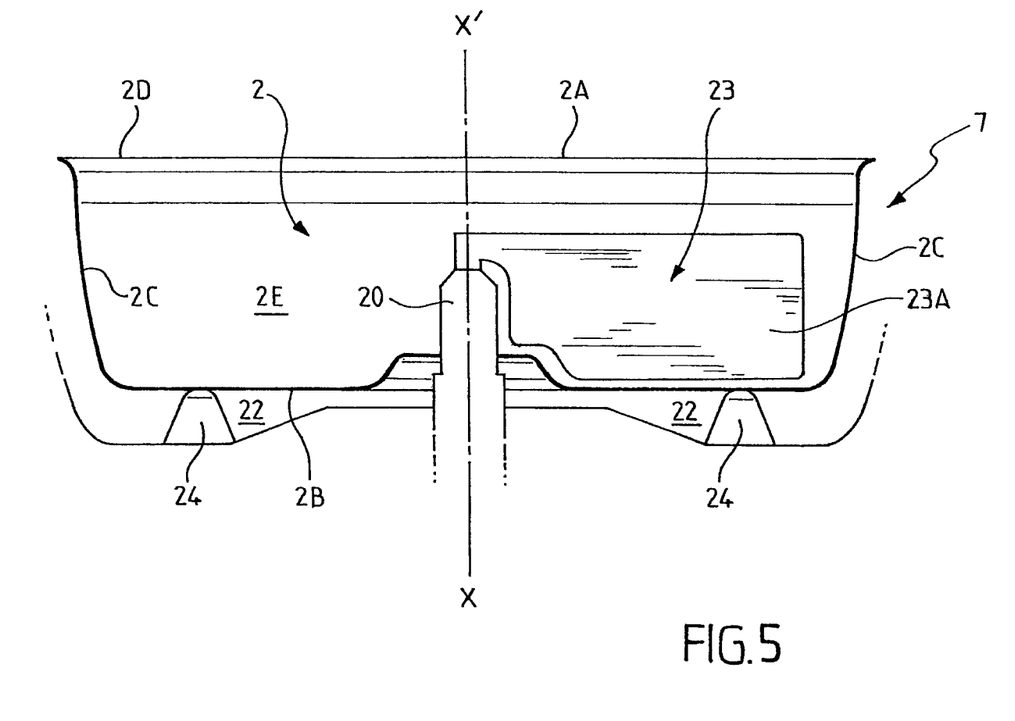
FIG. 5 is a diagrammatic side view of a detail of the exemplary embodiment of the appliance of FIGS. 3 and 4.

In the variant shown in FIGS. 3-5, the stirrer means 23 are mounted to move in rotation relative to the housing 8 and to the food-receiver 2, while the food-receiver 2 are themselves mounted to be in a stationary position relative to the housing 8 and to the stirrer means 6, and the stirrer means are functionally connected to drive means for the purpose of being driven in rotation thereby.

However, it is quite possible, without going beyond the ambit of the invention, for the fryer 1 to implement stirrer means 23 that are mounted to be in a stationary position while the food-receiver 2 are mounted to move in rotation relative to the housing and to the stirrer means 6. Indeed this applies in the variant exemplary embodiment of the invention shown in FIGS. 1 and 2.

The stirrer means 23 are preferably driven in rotation by means of a second electric motor 19 provided with an output shaft 20 that extends substantially along the axis X-X', and that receives either the stirrer means 23 (as in the variant shown in FIGS. 3-5) or the food-receiver 2 (as in the variant shown in FIGS. 1 and 2). In the exemplary embodiments shown in FIGS. 2 and 3, the second electric motor 19 is installed in a recess provided in the base 8A.

Preferably, the stirrer means 23 comprises a blade 23A that is stationary (variant of FIGS. 1 and 2) or rotary (variant of FIGS. 3-5), and that is disposed in the internal volume 2E defined by the receptacle 2A, so as to move the food that is present in the receptacle 2A.

In the preferred variant of FIGS. 3-5, once the food 100 and the fat has been disposed (manually and/or automatically) in the receptacle 2A, the blade 23A is driven in rotation by means of the second electric motor 19 and of the shaft 20, thereby contributing to turning over and to mingling the food and the fat, thereby coating the food 100 rapidly and substantially uniformly.

The blade 23A is preferably made of a material having good sliding properties. The blade 23A can advantageously be coated with a non-stick material, e.g., polytetrafluoroethylene (PTFE), or indeed be made of stainless steel or polyamide 4-6.

Advantageously, the blade 23A is also mounted removably on the main body 2.

Advantageously, the stirrer means 23 for stirring the food 100 are also designed to work in favor of the food 100 being subjected substantially uniformly to the flow of air 4.

In other words, the stirrer means 23 advantageously perform a dual function, namely a function of coating the food 100 with fat and also a function of moving the food 100 in the flow of air 4 so that the flow comes to be applied substantially uniformly on each of the pieces of food and preferably substantially over the entire surface of each of the pieces of food.

Implementing such stirrer means 23 is particularly important when the flow of hot air 4A coming from the outlet 5 is not directed along the axis of symmetry of the receptacle 2A, but rather is offset radially relative to the axis X-X', as shown in FIG. 3, for example.

Thus, when the stirrer means 23 comprise a blade 23A mounted to move in rotation relative to the food-receiver 2 in order to move the food 100 received in the food-receiver 2 (cf. FIG. 5), the blade 23A performs a dual function since the blade contributes simultaneously to coating the food to be fried with a film of fat, and also to pushing the food into the flow of air 4 and to turning it over therein in order to guarantee that the food is cooked uniformly.

In order to improve still further the cooking qualities of the fryer 1 of the invention, it is advantageous for the inside face of the receptacle 2A that is designed to face the food to be provided with a coating constituted mainly by silicone. In particular, it is advantageous to cover the top face of the bottom 2B of the receptacle 2A with a coating of silicone. By means of its micro-porous properties, silicone presents specific qualities of reacting with the fat (forming an emulsion) enabling the oil to be distributed better over the food while also having an excellent coefficient of friction, which is very useful for preserving the structural integrity of the food during the coating by mingling, e.g., by means of a blade. In addition, such a silicone-lined receptacle offers the advantage of heating the fries that are in contact with it, without burning them or over-coloring them as a metal receptacle would, for example. The applicant has thus observed that the properties of transfer by conduction between the fries and a silicone-lined receptacle are substantially comparable to the properties of transfer by forced convection of hot air over the fries. By means of such a silicone coating, cooking uniformity is guaranteed while avoiding, in particular, any browning of the tips of the fries.

It is also possible for all or some of the inside face of the receptacle 2A to be coated with a material whose majority component is PTFE, which presents excellent thermal and tribological properties.

It is, however, possible for the receptacle 2A merely to be made of stainless steel, without any special coating.

Advantageously, in operation (i.e., when the lid is closed), the fryer 1 of the invention forms a cooking enclosure that is substantially closed around the food-receiver 2, i.e., that is preferably closed in an airtight manner, it also being possible for the enclosure preferably to be provided with calibrated steam-release means (not shown) for allowing steam to leak to the outside in a calibrated manner.

This technical measure makes it possible to control the humidity prevailing inside the enclosure.

To this end, the calibrated steam-release means are dimensioned as follows:
  so as to avoid pressure cooking, which would be the cooking mode if the enclosure were completely airtight and which could cause the fries to break up; and
  so as to work in favor of low energy consumption, since, if too large an amount of steam were allowed to escape that would also give rise to a large amount of energy being given off, which would make it necessary for the heat-generator element 30 to be overdimensioned.

Preferably, the calibrated steam-release means comprise a release orifice (not shown) that is preferably disposed in the vicinity of the louvered intake 6A, thereby enabling steam to escape continuously and in a controlled manner throughout the cooking cycle, and enabling the air inside the enclosure to be renewed in a controlled manner.

An example of use of the fryer 1 of the invention, and more particularly of the fryer 1 corresponding to the variant shown in FIGS. 3-5, is described below.

In this example, the user of the appliance 1 proposes to fry 1 kg of hand-cut pieces 100 of fresh potato.

For this purpose, the user opens the lid 8C of the appliance 1 and inserts the pieces of potato 100 into the receptacle 2A, the pieces of potato 100 resting on the bottom 2B of the receptacle 2A in question.

The user also inserts a small quantity of oil (e.g., 30 grams (g) or less) into the receptacle 2A.

Because of the small quantity of oil used, the user can use an oil that is of excellent quality, which can be better for health and/or better tasting than an ordinary-standard oil.

The user then closes the lid 8C of the appliance and starts the cooking cycle, e.g., by depressing a switch.

The cooking cycle then starts, thereby rotating the blade 23A about the axis X-X', which blade is constrained to rotate with the shaft 20 that passes through an orifice provided in the bottom 2B and is driven in rotation by the motor 19. The blade 23A rotating in this way mingles the pieces of potato 100 and the oil distributed inside the receptacle 2A. This mingling causes a film of oil to be formed at the surface of each piece 100 of potato.

Simultaneously, or optionally after a predetermined latency time, the centrifugal fan 15 and the heat-generator element 13 are switched on, thereby causing the flow of hot air 4 to be established that heats directly the pieces of potato 100 as coated with oil.

The receptacle 2A thus acts as a cooking chamber.

Frying takes place by direct heating of the food by means of a flow of hot air and not, as in the prior art, by immersing the food in a bath of hot fat.

The flow of hot air 4 circulates inside the appliance 1 in the following cycle:
  the fan 15 propels a first flow segment 4B towards and into the heat-generator element 13;
  by passing through the heat-generator element 13, the first flow segment 4B is transformed into a second hot air flow segment 4C, which is directed through the duct 30 and under the effect of the drive from the fan 15 to the ejection nozzle 5A;
  this flow of hot air is thus propelled from the nozzle 5A in the form of a third segment 4A formed, in this example, by a single hot air stream, towards the food 100, in the receptacle 2A;
  the flow of hot air thus circulates at the food 100 in the form of a fourth segment 4D serving to heat the food; under the effect of coming into contact with the food 100, the segment 4D transmits its heat to the food 100 so as to fry them;
  the segment 4D is removed from the receptacle 2A in the form of a fifth segment 4E that rises along the side wall 2C inside the receptacle 2A, while brushing the wall 2C, up to the top 2D thereof, whereupon the fifth segment 4E effects a U-turn so as to be directed towards the bottom of the appliance, through the interstitial space 21 provided between the side wall 2C and the housing 8;
  the flow of hot air then goes under the bottom 2B in the form of a sixth segment 4F, through the interstitial space 22 provided between the bottom 2B and the housing 8 until the flow of hot air reaches the suction inlet 6A; the segment 4F thus follows a path that is substantially parallel to the bottom 2B and brushes the wall thereof, preferably substantially over the entire surface thereof; and
  once the flow of hot air reaches the suction inlet 6A, the flow segment 4F is sucked in by the fan 15 and is recycled as a first segment 4B.

Thus, the screen 7 forces the flow of air 4 to go on a roundabout route from the inside of the food-receiver 2 in order to reach the air inlet 6.

It can thus be seen that the screen 7 formed by the receptacle 2A preferably co-operates with the housing 8 to define circulation ducts for the flow of air 4, the ducts being arranged so as to define a twisty path with baffles for the flow of air 4 so as to optimize the heat transfer between the flow of air and the food 100 and the receptacle 2A.

The cooking mechanism is as follows:

In a first stage of the cooking cycle, the fan-driven air of the flow 4 heats the pieces of potato 100 of the top layer, which pieces rapidly produce steam. By condensing onto the cooler pieces of the lower layers, this stream thus acts as a heat exchanger for exchanging heat with the pieces of the lower layers. This mechanism of cooking in a steam-saturated atmosphere thus makes it possible for all of the pieces of potato present in the receptacle 2A to be heated rapidly and homogeneously. Homogeneous heating is facilitated by the pieces being continuously mingled by the blade. The food is thus subjected to a direct heating cycle in which the food is heated directly by the flow of hot air, and then to a diffusion/absorption cycle in which heat is diffused/absorbed inside the food, and then to another direct heating cycle in which the food is heated directly by the flow of hot air, and so on.

The pieces are subjected to superheating when they are in the direct flow of air, and they absorb heat when they leave that zone, before being superheated once again. This alternation makes it possible to improve diffusion of heat in the food, and contributes to avoiding excessive drying out.

In the first stage of the cycle, a balance is thus established between evaporation and recondensation, until the steam has been progressively removed from the fryer via the calibrated release means.

Then a second cooking stage starts, once the steam content has been significantly reduced. During this second stage, the mean temperature in the enclosure substantially reaches 160° C. (whereas the mean temperature was approximately in the range 100° C. to 120° C. during the first stage) and the Maillard reaction (coloring of the fries) takes place. During this second stage, the pieces continue to be mingled continuously by means of the blade 16 in order to homogenize the cooking.

The cooking cycle which, in all, lasts about 30 minutes, then ends. The user can then open the lid 8C and extract the receptacle 2A from the housing 8. The receptacle 2A then acts as a serving dish, and contains fries ready to be served and whose taste and appearance are similar to those of fresh fries cooked by being completely immersed in a bath of oil.

The invention can be used industrially in designing, manufacturing, and using an appliance for cooking food.

The invention claimed is:

1. A household appliance for cooking and/or heating food, comprising:
    a) a food-receiver including a receptacle providing an upwardly open zone for holding loose pieces of food, said receptacle having a bottom and a side wall with a top edge, said bottom and said side wall being at least substantially non-perforated, defining said food-holding zone, and being designed to contain fat in liquid form in said food-holding zone;
    b) a heater for heating the loose pieces of food, the heater comprising a generator for generating a flow of air, an air outlet from which air is blown toward the food-holding zone of the receptacle, and an air inlet via which air is sucked in thereby to set up the flow of air from the outlet toward the food-holding zone and thence from the food-holding zone to the inlet, the air inlet being distinct from the air outlet and the air outlet being positioned above the receptacle, so as to open out substantially towards the food-holding zone, said air inlet having a vertical extant which is at least in part lower than the top edge of the receptacle side wall but higher than the bottom of the receptacle; and
    c) a housing that defines a compartment inside which the receptacle is mounted, the air outlet and the air inlet opening out into the compartment;
    wherein the receptacle constitutes a screen arranged, and positioned between the food-holding zone and the air inlet, to force the flow of air from the food-holding zone to the air inlet to go around the screen in order to reach the air inlet from the receptacle, wherein the screen is formed by a deflector wall for deflecting the flow, which deflector wall comprises the receptacle bottom and side wall, has opposed faces, is arranged to form an obstacle preventing air present in the receptacle from returning directly in a straight line to the air inlet, is interposed across the path of the flow of air from the outlet to the inlet and is it least substantially non-perforated, so as to prevent a large proportion of the flow of air passing directly through the deflector wall in order to reach the inlet, and so as to cause the air of said flow from the receptacle to the air inlet successively to flow in a first direction along a first of said opposed faces, to make a U-turn around the top edge of the receptacle side wall, and to flow along the other of said opposed faces in a direction opposite to said first direction, thereby making the path of the flow of air from the outlet to the inlet sinuous to enhance the dwell time of hot air of the flow inside the receptacle.

2. The appliance of claim 1, wherein the air outlet is arranged relative to the receptacle so that the air blown from the air outlet is blasted directly onto the loose pieces of food in the food-holding zone.

3. The appliance of claim 1, wherein the air inlet is positioned at a height that is significantly lower than the height at which the top edge of the receptacle side wall is situated.

4. The appliance of claim 1, wherein the air inlet opens out laterally relative to the receptacle.

5. The appliance of claim 1, wherein the housing comprises a base and a lid between which a side skirt extends so as to define said compartment inside which the receptacle is mounted, the air outlet and the air inlet opening out into the compartment respectively at the lid and at the skirt.

6. The appliance of claim 5, wherein the appliance has a back and a front, the generator is disposed within the housing at the back of the appliance, and the lid includes a transparent window adjacent the front of the appliance.

7. The appliance of claim 6, wherein the generator comprises a centrifugal fan mounted on the base or on the skirt and not on the lid.

8. The appliance of claim 1, wherein the generator for generating the flow of air is designed to provide circulation of air in a closed circuit inside the appliance.

9. The appliance of claim 1, wherein the heater comprises a heat-generator element for heating the air that is to be blown from the air outlet.

10. The appliance of claim 1, wherein the generator for generating the flow of air comprises an air drive disposed in air-flow communication between the air inlet and the air outlet, the drive being designed both to suck in air via the inlet and also to deliver the sucked-in air via the outlet.

11. The appliance of claim 10, wherein the air drive comprises a centrifugal fan.

12. The appliance of claim 1, further comprising a stirrer for stirring the food, so as to work in favor of subjecting the food substantially uniformly to the flow of air.

13. The appliance of claim 1, wherein the stirrer comprises a blade that is mounted to rotate relative to the receptacle so as to move the food received in the food-receiver.

14. The appliance of claim 1, wherein the appliance is designed and dimensioned for cooking and/or heating a particular type of food, such as pieces of potato.

15. The appliance of claim 1, wherein the appliance constitutes a dry-fryer.

16. The appliance of claim 1, wherein the air inlet and the receptacle are mutually arranged so that between the U-turn and the inlet, the flow of air passes beneath and brushes against the bottom of the receptacle thereby contributing to keeping the bottom of the receptacle at an elevated temperature.

17. The appliance of claim 1, wherein the receptacle, including the bottom and side wall thereof, has an uninterrupted non-perforated structure at least in the food-holding zone where it interfaces with food and fat.

* * * * *